(12) United States Patent
Masloff et al.

(10) Patent No.: US 8,172,937 B2
(45) Date of Patent: May 8, 2012

(54) LIGHTWEIGHT DRAINABLE CELLULAR CONCRETE

(75) Inventors: Brian Masloff, Westminster, CO (US); Richard Palladino, Evergreen, CO (US)

(73) Assignee: Cellular Concrete, LLC, Allentown, PA (US)

( * ) Notice: Subject to any disclaimer, the term of this patent is extended or adjusted under 35 U.S.C. 154(b) by 956 days.

(21) Appl. No.: 11/871,079

(22) Filed: Oct. 11, 2007

(65) Prior Publication Data

US 2009/0071376 A1    Mar. 19, 2009

Related U.S. Application Data

(60) Provisional application No. 60/972,535, filed on Sep. 14, 2007.

(51) Int. Cl.
*C04B 38/10* (2006.01)
(52) U.S. Cl. ......... 106/672; 106/675; 106/679; 106/713
(58) Field of Classification Search .................. 106/672, 106/675, 679, 713
See application file for complete search history.

(56) References Cited

U.S. PATENT DOCUMENTS

| 5,080,534 | A |   | 1/1992 | Goodson et al. |
|---|---|---|---|---|
| 5,203,629 | A | * | 4/1993 | Valle et al. ......................... 366/2 |
| 5,494,514 | A |   | 2/1996 | Goodson et al. |
| 5,776,243 | A | * | 7/1998 | Goodson et al. .............. 106/677 |

OTHER PUBLICATIONS

JP 2005060188 A (Mar. 10, 2005) Hiyama et al. abstract only.*
JP 2005060188 A (Mar. 10, 2005) Hiyama et al. Machine Translation into English.*

* cited by examiner

*Primary Examiner* — Paul Marcantoni
(74) *Attorney, Agent, or Firm* — HolzerIPLaw, PC

(57) ABSTRACT

A lightweight pervious cellular concrete is provided. The concrete has an internal structure comprising interconnected channels, resulting in a permeability K value of less than about $1 \times 10^{-5}$, and as low as about 1. The cellular concrete has a density range of between 10 to about 100 pounds per cubic foot, with a compressive strength of between about 10 to about 1000 psi.

23 Claims, 3 Drawing Sheets

200

300

LIGHTWEIGHT DRAINABLE CELLULAR CONCRETE

CROSS REFERENCE TO RELATED CASES

The present case claims priority to U.S. Provisional Patent Application No. 60/972,535 entitled "LIGHTWEIGHT DRAINABLE CELLULAR CONCRETE", Masloff et al., filed 14 Sep. 2007, the entirety of which is incorporated herein by reference for all purposes.

BACKGROUND

Concrete is used more than any other manmade material on the planet. As of 2005, about six billion cubic meters of concrete are made each year, which equals one cubic meter for every person on Earth. More than 55,000 miles of freeways and highways in America are made of this material. The type of structure being built as well as the method of construction determines how concrete is placed and the composition of the concrete mix. Portland cement is the most common type of cement used in making concrete. It is a basic ingredient of concrete, mortar and plaster. Water is also commonly used for manufacturing concrete. The water to cement ratio (mass ratio of water to cement) is the key factor that determines the strength of concrete. In order to ensure economical and practical solutions to concrete needs, both fine and coarse aggregates are often utilized to make up the bulk of the concrete mixture. In addition, chemical admixtures in the form of powder or fluids are added to the concrete to give it certain characteristics not obtainable with plain concrete mixes. The most common types of admixtures are accelerators, retarders, air-entrainers that add and distribute tiny air bubbles in the concrete, plasticizers that increase the workability of fresh concrete, pigments, corrosion inhibitors, bonding agents and pumping aids.

There are several different types of concrete that are useful in different circumstances. For example, pervious concrete is sometimes specified by engineers and architects when porosity is required to allow some air movement or to facilitate the drainage and flow of water through structures. Additionally, pervious concrete pavement is an effective means to address important environmental issues and support sustainable growth. By capturing rainwater and allowing it to seep into the ground, porous concrete is instrumental in recharging groundwater, reducing stormwater runoff, and meeting US Environmental Protection Agency (EPA) stormwater regulations. The use of pervious concrete is among the Best Management Practices (BMPs) recommended by the EPA, and by other agencies and geotechnical engineers across the country for the management of stormwater runoff on a regional and local basis. Such pavement technology creates more efficient land use by eliminating the need for retention ponds, swales, and other stormwater management devices.

SUMMARY

Formulations for a lightweight, pervious, pumpable cellular concrete and methods for making the cellular concrete are provided. The cellular concrete has an internal structure comprising a network of interconnected capillaries, resulting in a cellular concrete with a permeability K value of about 1 to about $1 \times 10^{-5}$, a density range of between about 10 to about 100 pounds per cubic foot, with a compressive strength of between about 10 to about 1000 psi.

Thus, in some implementations there is provided a pervious cellular concrete comprising a base mix and foam wherein interconnected capillaries are formed by the foam providing the pervious cellular concrete with a permeability K value (cm/sec) of about 1 to about $1 \times 10^{-5}$. In some implementations, the pervious cellular concrete is pumpable. In addition, in various implementations the pervious cellular concrete has one or more of the following characteristics: a density range of between about 10 to about 100 pounds per cubic foot; a compressive strength of between about 10 to about 1000 pounds per square inch; a slump value of about 2 to 11.5 In some implementations, the foam is pre-generated; that is, a foam is generated and added to the base mix slurry; in other implementations, the constituents of the foam (typically comprising water, and a foaming agent) are added to the base mix slurry without being pre-combined.

In some implementations, the pre-generated foam comprises from about 10 to about 95% of the base composite volume of the pervious cellular concrete with the base mix slurry comprising the remainder of the pervious cellular concrete. Also, in some implementations the base mix comprises about 5% to about 60% water and about 5% to about 80% cement. In yet other implementations, the base mix further comprises about 5% to about 100% of a pozzolan and/or about 5% to about 95% sand. In alternative implementations, the base mix further comprises zeolite, pumice, high-carbon fly ash or vermiculite to filter contaminants during water drainage.

Other implementations provide a method for forming a pervious cellular concrete comprising forming a base mix slurry in a vessel; preparing a foam; injecting the foam into the base mix slurry in the vessel to form a foam mix; mixing the foam mix to form wet pervious cellular concrete; pumping the wet pervious cellular concrete; and allowing the wet pervious cellular concrete to dry and harden. The addition of the foam to the base mix slurry ultimately creates interconnecting capillaries in the dried cellular concrete resulting in a permeability K value of about 1 to about $1 \times 10^{-5}$. In some implementations, the base mix slurry comprises about 2% to about 60% water, about 5% to about 80% concrete, about 5% to about 80% sand, about 5% to about 100% pozzolan, and/or about 5% to about 80% zeolite, pumice, high-carbon fly ash or vermiculite. In some implementations, the foam is pre-generated, i.e., the foaming agent, water and pressurized air are pre-mixed; however, in other implementations, the foaming surfactant is added directly to the base mix slurry. Also in some implementations, the foaming agent comprises from about 20% to about 95% of the base composite volume of the foam mix.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following written Detailed Description and by implementations illustrated in the accompanying drawings.

BRIEF DESCRIPTIONS OF THE DRAWINGS

DETAILED DESCRIPTION

Figure 1:
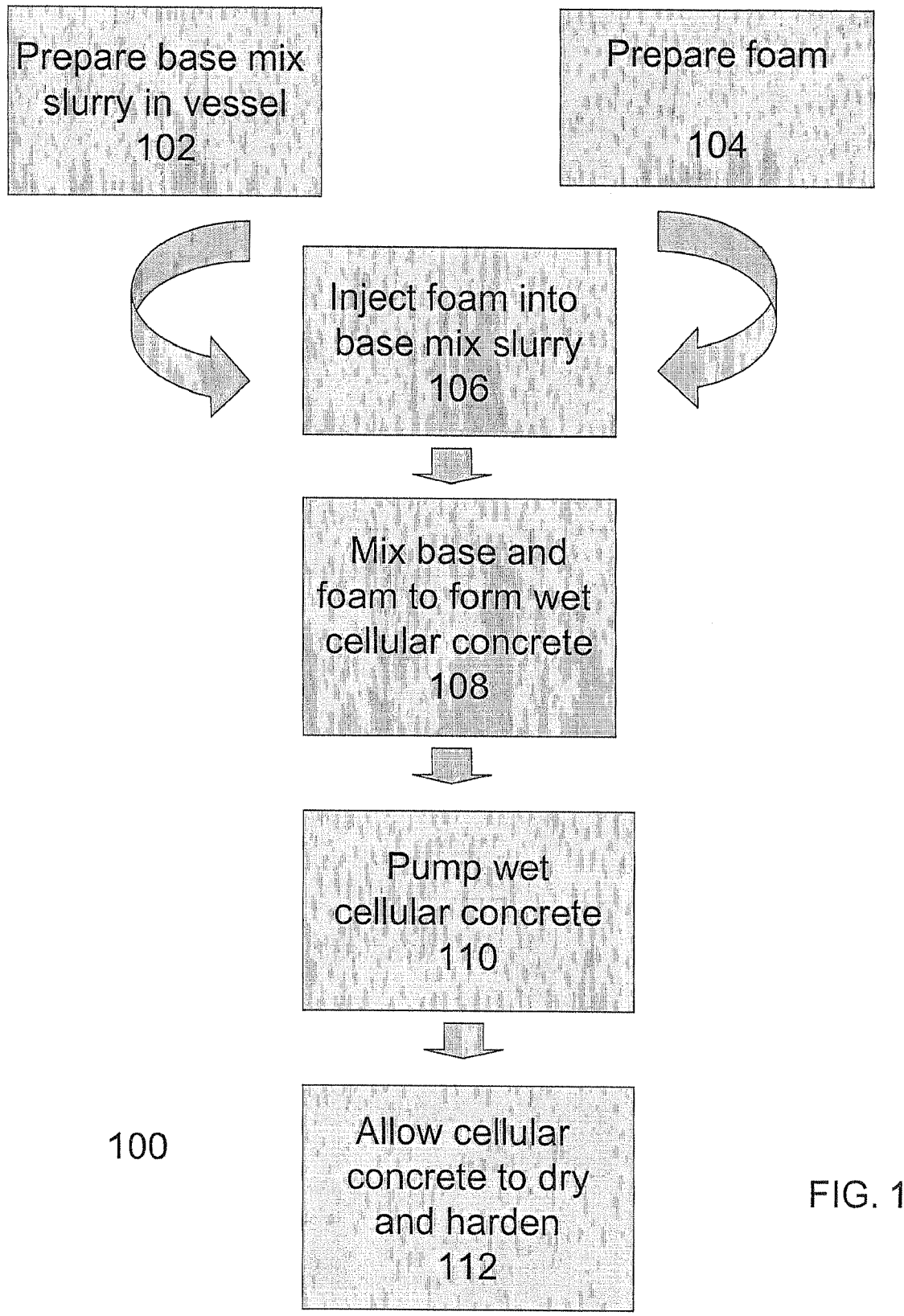
FIG. 1 is a flow chart showing the steps of one implementation of a method of the technology provided.

Technology is described herein for providing a lightweight, pervious, pumpable cellular concrete. The cellular concrete has an internal structure comprising interconnected capillaries, resulting in a permeability K value of about 1 to about $1\times10^{-5}$, a unit density range of between about 10 and 100 pounds per square foot, with a compressive strength of between about 10 and 1000 psi. Table 1 herein provides relative values of permeability, ranging from a K value of 1, which represents a very permeable formation such as loose gravel, to a K value of less than $1\times10^{-7}$, which represents an impermeable formation such as clay. Thus, the pervious cellular concrete provided herein ranges from low permeability (K value of $1\times10^{-5}$) to very permeable (K value of 1), depending on the formulation and how the pervious cellular concrete is mixed, pumped and used.

TABLE 1

| Relative Permeability | Values of K (cm/sec) | Typical Formation |
|---|---|---|
| Very permeable | 1 | coarse gravel, rock |
| Medium permeability | $1 \times 10^{-3}$ | sand, fine sand |
| Low permeability | $1 \times 10^{-3}$-$1 \times 10^{-5}$ | silty sand, dirty sand |
| Very low permeability | $1 \times 10^{-5}$-$1 \times 10^{-7}$ | silt, fine sandstone |
| Impervious | $>1 \times 10^{-7}$ | clay, mudstone |

There are a multitude of applications where water drainage is suitable, useful or desired such as in road construction, landscaping or French drains for dwellings. Typically drainage is required at the base of the structure or area. In general, soils such as sands, salty sands, gravel, sand blends or concrete composites comprising rock or gravel aggregates have been used to obtain water permeability. However, the handling and placement costs of weighty materials, blends and composites have become more expensive due to the rising cost of fuel and labor. Moreover, the environmental impact of using composite-type formulations of concrete can be detrimental in some locations. When these materials are used, compaction of the underlying soil is often required—to a density range of 85-130 pounds per cubic foot—for consolidation and to prevent future settlement. Additionally, in certain circumstances the underlying subgrade soils are not capable of supporting heavy composite formulations, and a lighter-weight drainable material is desired.

The lightweight, pervious, pumpable cellular concrete technology provided has numerous uses, such as for geotechnical fill (replacing unstable soil to reduce subsistence of roadways, bridges and other structures); backfill and annular grouting; providing shock absorption in earthquake zones; reducing loads in underground structures; filling voids within silos, abandoned mines, underground tanks and pipelines; and reducing hydrostatic pressure on retaining walls. In some implementations, the pervious, pumpable cellular concrete technology is generated by injecting a pre-generated foam into a base mix slurry comprising, in some implementations, water and cement, and in various implementations, sand; fly ash, bottom ash or other pozzolan; and/or a highly-absorbent component such as zeolite, pumice or high-carbon fly ash to filter contaminants from the liquid that drains through the pervious cellular concrete. The lightweight, pervious cellular concrete is inert, virtually self-leveling (has a high slump value), insulting, may be made in a broad range of densities and compressive strengths, and has no flash point.

FIG. 1 is a flow chart showing the steps of one implementation of a method 100 of the technology provided. In one step, a base mix slurry is prepared (102). The base mix slurry in some implementations comprises between about 2% and about 60% water; and between about 5% and 80% concrete. In various implementations, other constituents are added to the base mix slurry, where such other constituents can comprise between about 5% to about 80% sand, about 5 to about 100% pozzolan, and/or about 2% to about 95% zeolite, pumice, high-carbon fly ash or other absorbent filtering agent. Pozzolans useful in the present pervious cellular concrete typically include any vitreous silicate that, when combined with calcium hydroxide, exhibits cementitious properties, such as fly ash, bottom ash, slag cement, kiln dust and other calcium silicates. The base mix slurry can be formed in a drum mixer, a continuous mixer or any type of mixer that can create sufficient shear to thoroughly mix the base mix slurry.

In another step shown in FIG. 1, foam is prepared (104). FIG. 1 illustrates an implementation of a method where the foam is pre-generated or formed before being injected into the base mix slurry; however, in other implementations the foam is not pre-generated; that is, the separate constituents of the foam are added to the base mix slurry for mixing. The foam comprises in some implementations a cationic or anionic surfactant foaming agent, a solvent (typically water) and/or pressurized air. In some implementations, the foam will comprise about 0.2% to about 20.0% water, about 80% to about 98.8% foaming agent, and pressurized air is delivered at about 0.5 to about 100 scfm resulting in a foam having a density of about 1.0 to about 5.0 pounds per cubic foot. In addition, depending on the ultimate use of the pervious cellular concrete, the foam may be enhanced using other components such as plasticizers and the like. The foam may be added to the vessel where the base mix slurry is being mixed in a continuous-type tumbling mixer or by an auger configuration, or the foam may be added into a concrete hose line through which the base mix slurry is passing in an in-line mixing configuration.

Once injected into the base mix slurry (104), the foam is mixed with the base mix slurry for a period of time—typically about 30 sec to about 15 minutes—to form wet cellular concrete (106). The foam, whether pre-generated or not, provides millions of micro-bubbles within the wet cellular concrete. Upon injecting the foam into the base mix slurry to form the wet cellular concrete (104), the micro-bubbles initially are relatively non-interconnected and random in size; however, once the wet cellular concrete is mixed and begins to cure, the micro-bubbles begin to coalesce forming a film between the bubbles where the wet cellular concrete paste does not penetrate. Also partially-formed nonstable bubbles can also make the matrix permeable through coalescence.

Once the base mix slurry and foam are mixed, the wet cellular concrete is pumped or dispensed into place (110). Unlike other pervious concrete, the pervious cellular concrete technology provided is readily pumpable, having a slump range of about 2.0 to about 11.5 or about 3.0 to 8.0. After the wet cellular concrete is completely cured and hardened (112), an open-pore, interconnected capillary network is created from the coalesced micro-bubbles allowing for water drainage, with a permeability K value of about 1 to about $1\times10^{-5}$ or about 1 to about $1\times10^{-3}$, a density range of between about 10 and 120 pounds per cubic foot or about 10 to about 50 pounds per cubic foot, with a compressive strength of between about 10 and 1000 psi or about 10 to about 500 psi.

Figure 2:
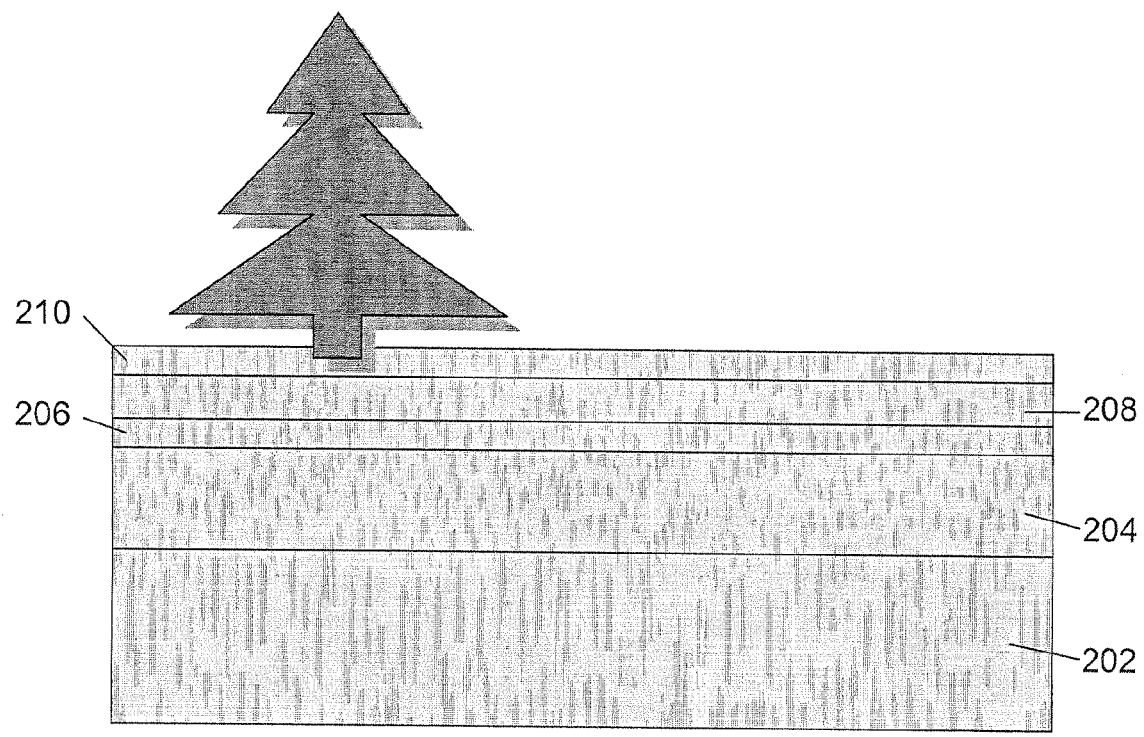
FIG. 2 is a simplified illustration of one use of the pervious cellular concrete provided.

FIG. 2 is a simplified illustration of one use of the pervious cellular concrete provided herein. FIG. 2 shows a structure 200 comprising swampy or loamy soil (202) upon which has been pumped or dispensed the present pervious cellular concrete (204). The pervious cellular concrete reduces soil loading while providing a stable base structure through which water and suspended solids may pass. Structure 200 shows an optional layer of filter fabric (206), which provides a barrier to prevent larger solids from passing through the pervious cellular concrete (204) and into the swampy or loamy soil (202). Layer 208 of structure is soil, upon which a grass layer (210) is growing. The structure 200 would be useful in reclamation of swamp lands for building buildings, parks or playing fields such as football, baseball or soccer fields.

Figure 3:
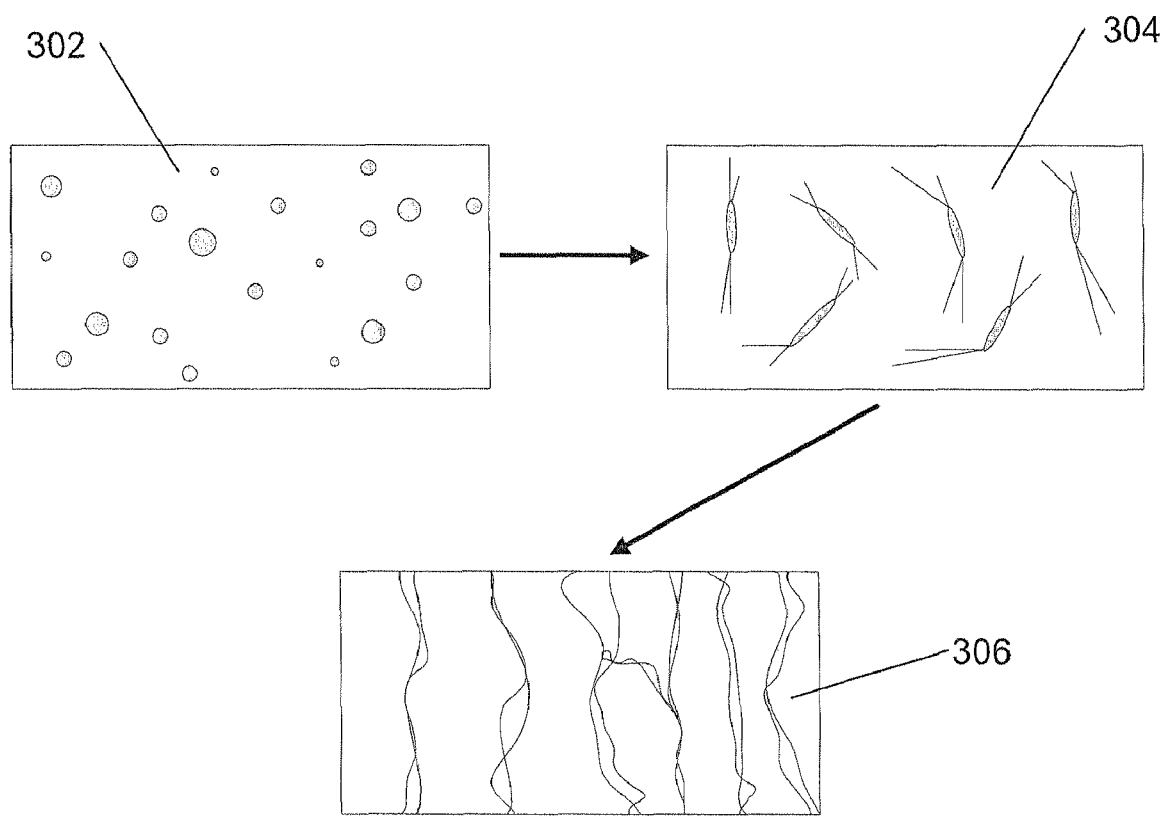
FIG. 3 is a simplified illustration of how interconnected channels are formed in the pervious cellular concrete of the present technology.

FIG. 3 is a simplified illustration of how interconnected capillaries are formed in the pervious cellular concrete of the present technology. The composition in 302 illustrates how the foam mix appears when the foam is injected into the base slurry mix before the foam mix has been mixed. At this point, the micro-bubbles of the foam still have their random size and have not begun to coalesce. The composition in 304 illustrates the appearance of the foam mix as it is mixed and becomes wet cellular cement. Note the bubbles are coalescing into structures with larger void volumes forming a film between the bubbles where the wet cellular concrete paste does not penetrate. The composition in 306 illustrates how in dried cellular concrete, the coalesced bubble form interconnected capillaries allowing for permeability K values of about 1 to about $1 \times 10^{-5}$.

The lightweight, pervious, cellular concrete may be made from a wide range of base mixes and with the foam comprising a wide variety of the base composite volume. Table 2 lists seven different example formulations demonstrating the wide range of pervious cellular concretes provided herein. In example 1, water comprises 35.6% of the base mix and 5.7% of the base composite volume, cement comprises 64.4% of the base mix and 3.3% of the base composite volume, and the foam comprises 91% of the base composite volume. In example 2, water comprises 33.3% of the base mix and 26.7% of the base composite volume, cement comprises 66.7% of the base mix and 17% of the base composite volume, and the foam comprises 56.4% of the base composite volume. In example 3, water comprises 20.0% of the base mix and 16.0% of the base composite volume, cement comprises 80.0% of the base mix and 20.3% of the base composite volume, and the foam comprises 63.7% of the base composite volume. In example 4, water comprises 55.6% of the base mix and 44.5% of the base composite volume, cement comprises 44.4% of the base mix and 11.3% of the base composite volume, and the foam comprises 44.2% of the base composite volume. In example 5, water comprises 20.0% of the base mix and 11.7% of the base composite volume, cement comprises 40.0% of the base mix and 10.2% of the base composite volume, sand comprises 40.0% of the base mix and 12.1% of the base composite volume, and the foam comprises 67.0% of the base composite volume. In example 6, water comprises 14.7% of the base mix and 23.6% of the base composite volume, cement comprises 7.7% of the base mix and 4.0% of the base composite volume, sand comprises 77.6% of the base mix and 46.9% of the base composite volume, and the foam comprises 25.5% of the base composite volume. In example 7, water comprises 3.5% of the base mix and 28.0% of the base composite volume, cement comprises 64.3% of the base mix and 16.1% of the base composite volume, sand comprises 32.2% of the base mix and 9.6% of the base composite volume, and the foam comprises 46.3% of the base composite volume. The expansion factor (the factor by which the volume of dried base mix is increased or expanded by the addition of the foam) with the addition of the foam in these examples (data not shown) ranges from a low value of 1.34 for example 6 (having the lowest base composite value for foam (25.5%) in these examples) to a high value of 11.1 for example 1 (where the base composite value for foam is highest at 91%).

TABLE 2

|  |  | Materials | Expanded Weight | Base Composite Volume |
|---|---|---|---|---|
| Example 1 |  | Water | 96 | 1.54 |
|  |  | Cement | 174 | 0.89 |
|  | Sub-total |  | 270 | 2.4 |
|  |  | Foam |  | 24.6 |
|  | Total |  |  | 27.0 |
| Example 2 |  | Water | 450 | 7.21 |
|  |  | Cement | 900 | 4.58 |
|  | Sub-total |  | 1350 | 11.8 |
|  |  | Foam |  | 15.2 |
|  | Total |  |  | 27.0 |
| Example 3 |  | Water | 270 | 4.33 |
|  |  | Cement | 1080 | 5.49 |
|  | Sub-total |  | 1350 | 9.8 |
|  |  | Foam |  | 17.2 |
|  | Total |  |  | 27.0 |
| Example 4 |  | Water | 750 | 12.02 |
|  |  | Cement | 600 | 3.05 |
|  | Sub-total |  | 1350 | 15.1 |
|  |  | Foam |  | 11.9 |
|  | Total |  |  | 27.0 |
| Example 5 |  | Water | 270 | 4.33 |
|  |  | Cement | 540 | 2.75 |
|  |  | Sand | 540 | 3.27 |
|  | Sub-total |  | 1350 | 10.3 |
|  |  | Foam |  | 16.7 |
|  | Total |  |  | 27.0 |
| Example 6 |  | Water | 398 | 6.37 |
|  |  | Cement | 209 | 1.06 |
|  |  | Sand | 2093 | 12.66 |
|  | Sub-total |  | 2700 | 20.1 |
|  |  | Foam |  | 6.9 |
|  | Total |  |  | 27.0 |
| Example 7 |  | Water | 471 | 7.55 |
|  |  | Cement | 856 | 4.36 |
|  |  | Sand | 428 | 2.56 |
|  | Sub-total |  | 1755 | 14.5 |
|  |  | Foam |  | 12.5 |
|  | Total |  |  | 27.0 |

In addition, the pervious cellular concrete is effective in removing contaminants in water on its own, or it may be formulated with absorbent materials such as zeolite and others disclosed above to increase absorbance. Such a formulation was tested measuring the concentration of Total Suspended Solids (TSSs). TSSs within storm water are a principal pollutant of streams and rivers. Various solid materials were tested to measure the amount of solids that are retained by three materials. The three materials tested were pervious cellular concrete (PCC), an impermeable material (IMP), and an absorbent material (ABS).

In the analysis, various types of solids were added to each of the PCC, IMP and ABS materials. The test materials were then rinsed with water from various heights (0.5" to 30.0") and the concentration of the solids in the rinse water (run off) was measured. The IMP material was used as a control for a benchmark of 0% TSS retention, and the ABS material was used as a control for maximum retention. The average results for retention of metals (TSS) for each test material are shown in Table 3.

TABLE 3

| Metal | IMP Average (µg/L) | PCC Average (µg/L) | ABS Average (µg/L) |
|---|---|---|---|
| Aluminum | 20,230 | 1014.0 | 549.6 |
| Chromium | 261 | 290.5 | 172.6 |
| Iron | 24,592 | 4978.8 | 2866.3 |
| Lead | 21.5 | 1.39 | 0.12 |

The ABS (benchmark for high absorbance) absorbed 97.3% of aluminum compared to the IMP material; 33% of chromium compared to the IMP material, 89.3% of iron compared to the IMP material, and 99.4% of lead compared to the IMP material. The PCC absorbed 95.0% of aluminum compared to the IMP material; less chromium than the IMP material, 80.0% of iron compared to the IMP material, and 94.0% of lead compared to the IMP material. Thus, the PCC formulated without an absorbent material such as zeolite or vermiculite was able to retain as much or more of 90% of the aluminum, iron and lead that the IMP material retained. The only TSS that the PCC failed to retain was chromium. It should be noted, however, that formulations of the PCC containing an absorbent material increase the absorbent properties of the PCC.

In addition, the PCC was tested for retention of oil. As above, oil was added to blocks of each test material (PCC, IMP, ABS) allowed to remain in place for a period of time, then each block was rinsed and the oil in the rinse water (run off) was measured. Test results (not shown) revealed that 97% of the oil remained on the PCC block as compared to the IMP block.

The present specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many formulations can be made without departing from the spirit and scope of the presently described technology, the appropriate scope resides in the claims hereinafter appended. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

We claim:

1. A pervious concrete having interconnected capillaries formed from bubbles of a foaming agent coalesced within a base mix, wherein the pervious concrete has a permeability K value of about 1 to about $1 \times 10^{-5}$ centimeters per second when cured.

2. The pervious concrete of claim 1, wherein the pervious concrete is pumpable, when wet.

3. The pervious concrete of claim 1, having a density of between about 10 to about 100 pounds per cubic foot, when cured.

4. The pervious concrete of claim 1, having a compressive strength of between about 10 to about 1000 pounds per square inch, when cured.

5. The pervious concrete of claim 1, having a slump value of about 2 to about 11.5, when wet.

6. The pervious concrete of claim 1, wherein foam is pre-generated from the foaming agent and injected into the base mix.

7. The pervious concrete of claim 6, wherein the pre-generated foam comprises from about 10% to about 95% of a base composite volume of the pervious concrete.

8. The pervious concrete of claim 1, wherein the base mix comprises about 2% to about 60% water by weight and about 5% to about 80% cement by weight, when wet.

9. The pervious concrete of claim 8, wherein the base mix further comprises about 5% to about 95% pozzolan by weight.

10. The pervious concrete of claim 8, wherein the base mix further comprises about 5% to about 80% sand by weight.

11. The pervious concrete of claim 8, wherein the base mix further comprises one or more of zeolite, pumice, high-carbon fly ash, and vermiculite to absorb contaminants.

12. The pervious concrete of claim 11, wherein the base mix comprises about 0% to about 80% of the one or more of zeolite, pumice, high-carbon fly ash, and vermiculite by weight to absorb contaminants.

13. A pervious concrete comprising a base mix and a foaming agent with interconnected capillaries there through, wherein the pervious concrete is pumpable when wet and has a permeability K value of about 1 to about $1 \times 10^{-5}$ centimeters per second when cured.

14. A method of forming a pervious concrete comprising:
combining a base mix and a foaming agent together to form a pervious concrete having interconnected capillaries wherein the pervious concrete has a permeability K value of about 1 to about $1 \times 10^{-5}$ centimeters per second, when cured.

15. The method of claim 14, wherein the combining operation further includes:
forming a base mix slurry from the base mix and a solvent in a vessel;
preparing a foam from the foaming agent;
injecting the foam into the base mix slurry to form a foam mix;
mixing the foam mix to form wet pervious concrete; and
pumping the wet pervious concrete.

16. The method of claim 14, wherein the combining operation further includes:
forming a base mix slurry from the base mix and a solvent in a vessel;
injecting the foaming agent into the base mix slurry;
mixing the foaming agent and the base mix slurry to form wet pervious concrete; and
pumping the wet pervious concrete.

17. The method of claim 15, wherein the base mix slurry comprises about 2% to about 60% water by weight and about 5% to about 80% cement by weight.

18. The method of claim 14, wherein the base mix comprises about 5% to about 80% sand by weight.

19. The method of claim 14, wherein the base mix comprises about 0% to about 95% pozzolan by weight.

20. The method of claim 14, wherein the base mix comprises about 0% to about 80% of one or more of zeolite, pumice, high-carbon fly ash, or vermiculite by weight to absorb contaminants.

21. The method of claim 15, wherein the foam comprises from about 10% to about 95% of a base composite volume of the wet pervious concrete.

22. The pervious concrete of claim 1, wherein the interconnected capillaries form an interconnected capillary network that allows for water drainage through the pervious concrete, when cured.

23. The pervious concrete of claim 13, wherein the interconnected capillaries form an interconnected capillary network that allows for water drainage through the pervious concrete, when cured.

\* \* \* \* \*